United States Patent
Eo et al.

(10) Patent No.: US 7,197,065 B2
(45) Date of Patent: Mar. 27, 2007

(54) REGION SEARCHER AND METHOD OF DRIVING THE SAME AND CODE SEARCHER USING THE SAME

(75) Inventors: Ik Soo Eo, Daejon-Shi (KR); Young Hoon Kim, Daejon-Shi (KR); Hee Bum Jung, Daejon-Shi (KR); Kyung Soo Kim, Daejon-Shi (KR)

(73) Assignee: Electronics and Telecommunications Research Institute (KR)

( * ) Notice: Subject to any disclaimer, the term of this patent is extended or adjusted under 35 U.S.C. 154(b) by 866 days.

(21) Appl. No.: 10/238,685

(22) Filed: Sep. 9, 2002

(65) Prior Publication Data

US 2003/0142735 A1    Jul. 31, 2003

(30) Foreign Application Priority Data

Jan. 25, 2002    (KR) .................................. 2002-4435

(51) Int. Cl.
    *H04B 1/69*    (2006.01)

(52) U.S. Cl. ...................... 375/150; 375/152; 375/343; 370/342; 370/208; 370/252; 455/456

(58) Field of Classification Search ................ 375/150, 375/152; 370/337, 350, 335; 455/456
    See application file for complete search history.

(56) References Cited

U.S. PATENT DOCUMENTS

| 5,982,763 A | 11/1999 | Sato |
| 6,088,382 A | 7/2000 | Maru |
| 6,167,037 A | 12/2000 | Higuchi et al. |

*Primary Examiner*—Chieh M. Fan
*Assistant Examiner*—Eva Zheng
(74) *Attorney, Agent, or Firm*—Blakely Sokoloff Taylor & Zafman

(57) ABSTRACT

A region searcher, a method of driving the same, and a code searcher using the same are disclosed. When a predetermined region is iteratively searched, the energy value corresponding to the same hypothesis location value is stored by using a searcher having divided two buffers, thereby the implementation complexity thereof can be remarkably reduced, without using a simple memory.

In addition, in case where the region is iteratively searched in the state of the deteriorated signal-to-noise ratio to find the energy value at one hypothesis location and in case where the region must be iteratively searched because of the restriction which the size of the matched filter can be not increased, the implementation complexity thereof can be remarkably reduced.

13 Claims, 4 Drawing Sheets

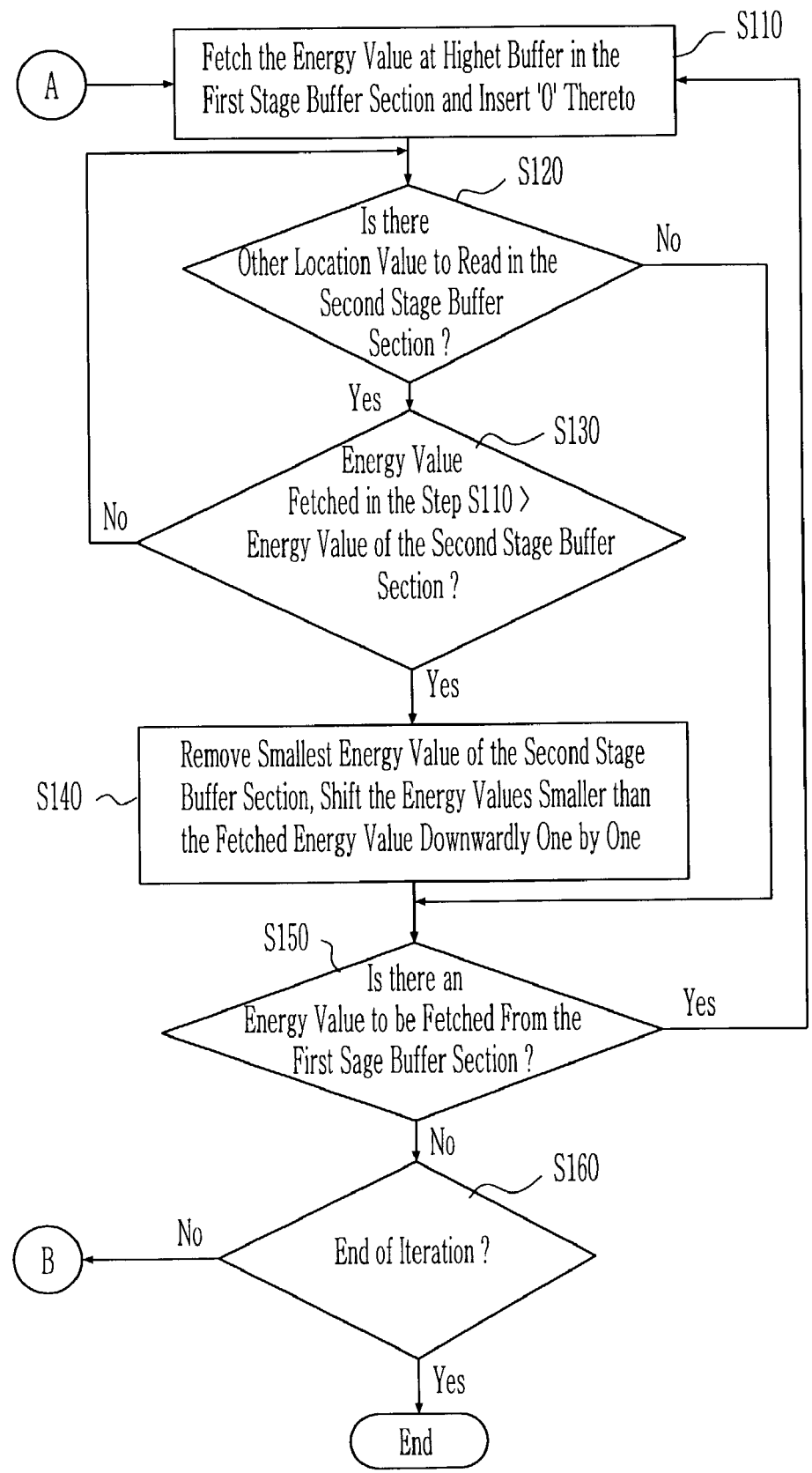

REGION SEARCHER AND METHOD OF DRIVING THE SAME AND CODE SEARCHER USING THE SAME

BACKGROUND OF THE INVENTION

1. Field of the Invention

The present invention relates to a region searcher, a method of driving the same, and a code searcher using the same, in particular, a region searcher which the complexity of the implementation thereof can be remarkably reduced by storing the energy value corresponding to the same hypothesis location value by using a searcher having divided two buffers, without simply using a memory, when a predetermined region is iteratively searched.

2. Description of the Prior Art

Generally, in the code division multiple access type cellular radio telephone communication system, the location of the spread code must be found. For this, there are a method using an active type correlator structure and a method using a passive type matched filter structure.

The method using the active type correlator structure is used in a terminal and so forth, because the structure thereof is simple. However, there is a problem that the signals must be collected for a long time in order to use the signal required for increasing the gain of a received signal. In addition, in this method, the used signal can not be repeatedly used, and the searching time thereof becomes longer than that of the method using the matched filter, because the signals arrived in the different time are collected and used as the location information of the spread code.

In the method using the matched filter structure, the received signals are stored in a buffer in received order and are multiplied by an expected input signal, thereby the sum of products is used as the location information of the spread code. Accordingly, since the location information of the spread code for every input signal sample is generated, the region can be searched at high speed. However, in order to obtain the needed signal gain, the length of the buffer must be long. Also, because the operation thereof is accomplished at the signal rate of the input sample, the structure thereof is complicated and the power consumption becomes increased.

FIG. 1 is a block diagram of a spread code searcher used in a conventional code division multiple access (CDMA) type cellular radio telephone communication system.

Referring to FIG. 1, the spread code searcher comprises a matched filter 10, an energy value converting section 11, an address generating section 12, a first memory section 13, and a second memory section 15.

The matched filter 10 receives in-phase signal (I data) and quadrature-phase signal (Q data), constructs the matched filter type structures using a predetermined spread signal pattern, and outputs the correlated values of the input signal. In this case, the correlated values are output to the energy value converting section 11 at every hypothesis location, and the energy value converting section 11 squares each of phase signals, and adds them to be converted to an energy value, such that each of the phase components in the in-phase signals and the quadrature-phase signals due to Rayleigh fading effect of the channel included in the correlated value is removed. Such obtained values exist in the hypothesis location in all.

In addition, if the signal-to-noise ratio thereof is very small, the obtained energy value therein is very small. Therefore, the energy values are iteratively obtained and are added them in order to increase the signal value. For performing such operation, the energy value obtained at the each of the hypothesis location is stored in the first memory section 13 so as to be added to a value that is newly obtained at the same hypothesis location. In case of constructing the structure by using the first memory section 13, an address for controlling the first memory section 13 must be generated in the address generating section. Also, the second memory section 15 for finding and storing the largest value among the values stored in the first memory section 13 is further needed.

In the code division multiple access type cellular radio telephone communication system, in order to find such a spread code location, a known signal having the inherent orthogonal characteristics is transmitted in case of a forward link which a base station transmits a signal to a terminal, and an inherent code signal using the high self-correlated property is transmitted in case of a reverse link which a terminal transmits a signal to a base station. Since these signals are used within the limited signal power in the overall system, the power of these signals cannot become larger than the certain limit.

In case where the location information of the spread code is obtained as mentioned above, when the power of the signal obtained at a time is not enough to determine the location, the signals are iteratively obtained at the searched region and are added to the previous obtained value, thereby the signal having the larger value can be obtained. At this time, if the size of the searched region is increased, in order to store the information therefor, a device for storing information having the value corresponding to the spread code location included in the searched region is needed.

SUMMARY OF THE INVENTION

Thus, the object of the present invention is to make an effective region searcher using a device of small size storing elements, in order to solve the above-mentioned problem that the information for the all spread code location included in the region must be stored.

In accordance with one aspect of the present invention, there is provided a region searcher comprising an input signal converting section for receiving an energy value and converting the energy value; a first buffer section and a second buffer section for the energy value converted by said input signal converting section; a comparing section for comparing an input location value with a location value stored in said second buffer section in order to search the location value stored in the second buffer section; an output signal converting section for converting an energy value stored in said second buffer section; and an adder for adding the energy value output from said input signal converting section and the energy value output from said output signal converting section and storing the added value to the second buffer section.

In accordance with another aspect of the present invention, there is provided a method of driving a region searcher comprising a first step for setting a variable; a second step for receiving an input energy value and an input location value by using an input signal converting section and an index comparing section; a third step for comparing said input location value with a location value stored in said second buffer section by using said index comparing section; a fourth step for converting said input energy value by a predetermined energy value ratio by using said input signal converting section, if said input location value is not equal to the location stored in said second buffer section in the third step; a fifth step for comparing the energy value converted in the fourth step with the energy value stored in said first buffer section, and, if the converted energy value is larger than the energy value stored in said first buffer section, replacing said converted energy value with an smallest energy value among the energy values stored in said first buffer section, and, if so not, receiving a new energy value; a sixth step for converting the input energy value and the energy value stored in said second buffer section by using a predetermined energy value ratio if said input location value is equal to the location value stored in said second buffer section in the third step; and a seventh step for removing the energy value stored in the location of said second buffer section corresponding to the input location value in order to store the energy value converted in the sixth step, aligning the energy values in the second buffer section in accordance with the size thereof, and storing said added energy values thereto.

In accordance with further another aspect of the present invention, there is provided a code searcher comprising a matched filter for receiving input signals including in-phase and quadrature phase components and outputting the correlated value of said input signals; an energy converting section for squaring the in-phase and the quadrature phase and adding them to be converted to an energy value, in order to remove the in-phase and quadrature phase components included in said correlated value; an index generating section for generating a location value corresponding to said energy value; and a region searcher having the structure according to claim 1 for receiving the energy value output from said energy value converting section and the location value generated by said index generating section to detect a code spread signal.

In accordance with the further another of the present invention, there is provided code searcher comprising a correlator for receiving input signals including in-phase and quadrature phase components and outputting the correlated value of said input signals; a code generating section for generating and outputting a code spread signal in successive code searching regions without the loss of calculation time; an energy converting section for squaring said in-phase and quadrature phase and adding them to be converted to an energy value in order to remove the in-phase and quadrature phase components included in said correlated value; an index generating section for generating a location value corresponding to said energy value; and a region searcher having the structure according to claim 1 for receiving the energy value output from said energy value converting section and the location value of said index generating section to detect the code spread signal.

BRIEF DESCRIPTION OF THE ATTACHED DRAWINGS

FIGS. 3a and 3b is flowcharts explaining the operation characteristics of the region searcher shown in FIG. 2.

DESCRIPTION OF THE PREFERRED EMBODIMENT

Hereinafter, the embodiments of the present invention will be explained with reference to the accompanying drawings.

Figure 1:
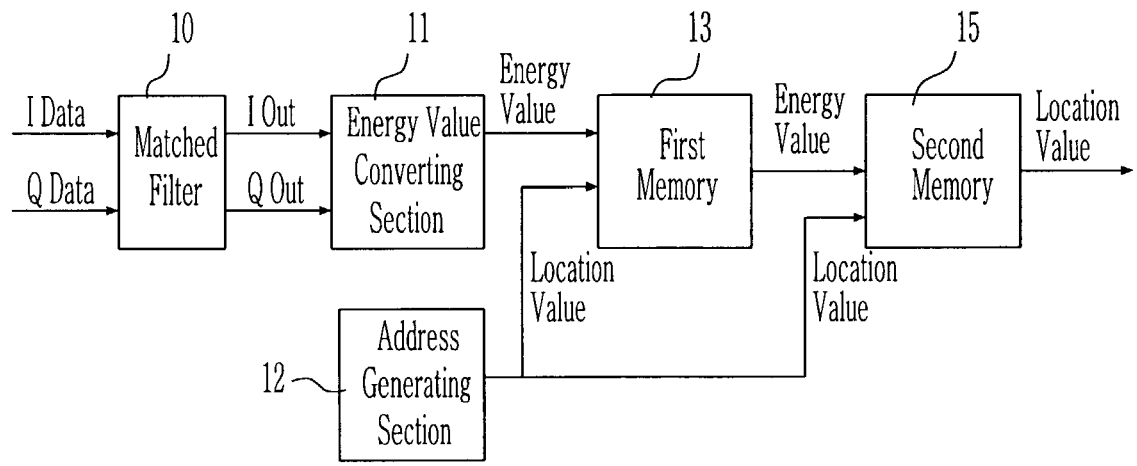
FIG. 1 is a block diagram of a spread code searcher used in a general code division multiple access (CDMA) type cellular radio telephone communication system.
Figure 2:
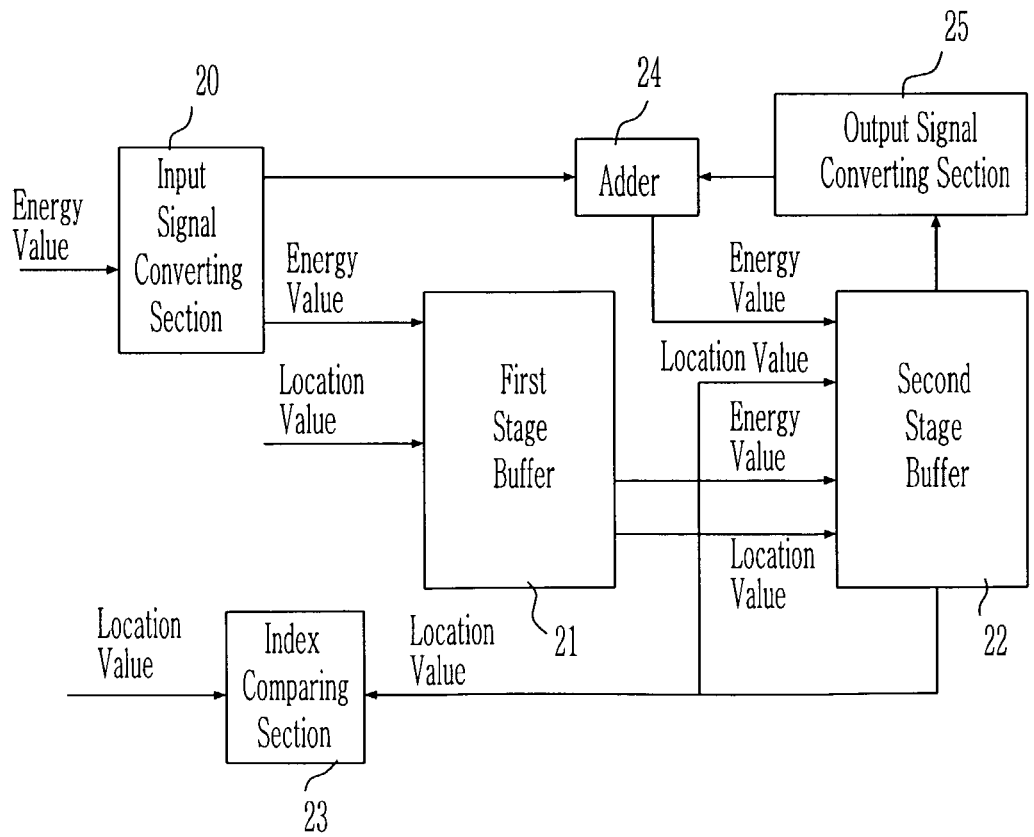
FIG. 2 is a block diagram of a region searcher according to an embodiment of the present invention.

FIG. 2 is a block diagram of a region searcher according to an embodiment of the present invention.

Referring to FIG. 2, the region searcher according to the present invention comprises an input signal converting section 20, a first stage buffer section 21, a second stage buffer section 22, an index comparing section 23, an adder 24, and an output signal converting section 25.

Where, the first stage buffer section 21 is connected with the input signal converting section 20 for converting the value of the input signal including the energy value and the location value, and the second stage buffer section 22 is connected with the output signal converting section for converting the energy value of the second stage buffer section 22. Also, the adder 24 for adding the energy value output from the input signal converting section 20 and the energy value output from the output signal converting section 25 and storing the added value to the second stage buffer section 22 is connected between the input signal converting section 20 and the output signal converting section 25.

In addition, the first stage buffer section 21 stores the large energy values by the allowable number among the energy values searched in a firstly searched region. Subsequently, in the iteratively searched region, the large energy values among the energy values in the locations which are different from the location value stored in the second stage buffer section buffer 22 are stored in descending order. The second stage buffer section 22 stores the results searched in a searched region, that is, the energy values corresponding to the locations of the values stored by the iterative searching operation.

Also, when the region is iteratively searched, index comparing section 23 compares the location value input to the index comparing section 23 and the location values stored in the second stage buffer section 22. At the comparison result, if there is an input location value is equal to the location value stored in the second stage buffer section 22, the adder 24 adds the energy value output from the input signal converting section 20 and the energy value output from the output signal converting section 25. In this case, the output signal converting section 25 has a corresponding energy value of input location value equal to the location value stored in the second stage buffer section 22. The added result is stored to the second stage buffer section 22. At this time, the first stage buffer section 21 stores the converted energy values and the location values by the allowable number in the first stage buffer section 21 in input energy sequence order, except for the location values stored in the second stage buffer section 22.

On the other hand, when the searching operation for the searched region is finished, only energy values having the number of energy values storable in the second stage buffer section 22 are stored to the second stage buffer section 22. The energy values were selected from the highest energy value in order of the magnitude of energy values among the energy values stored in the first and second stage buffer section 21 and 22. The contents of the first stage buffer section 21 are removed, and the searching operation for the next searched region is prepared. This operation is iteratively performed to store the values obtained at the same region to the first stage buffer section 21 and the second stage buffer section 22, and, when the searching operation for one searched region is finished, the energy values and the location values aligned according to the size thereof are stored to the second stage buffer section 22. When the searching operation for the given searched region is finished, the location values stored in the second stage buffer section 22 become the desired final region information.

Figure 3A:
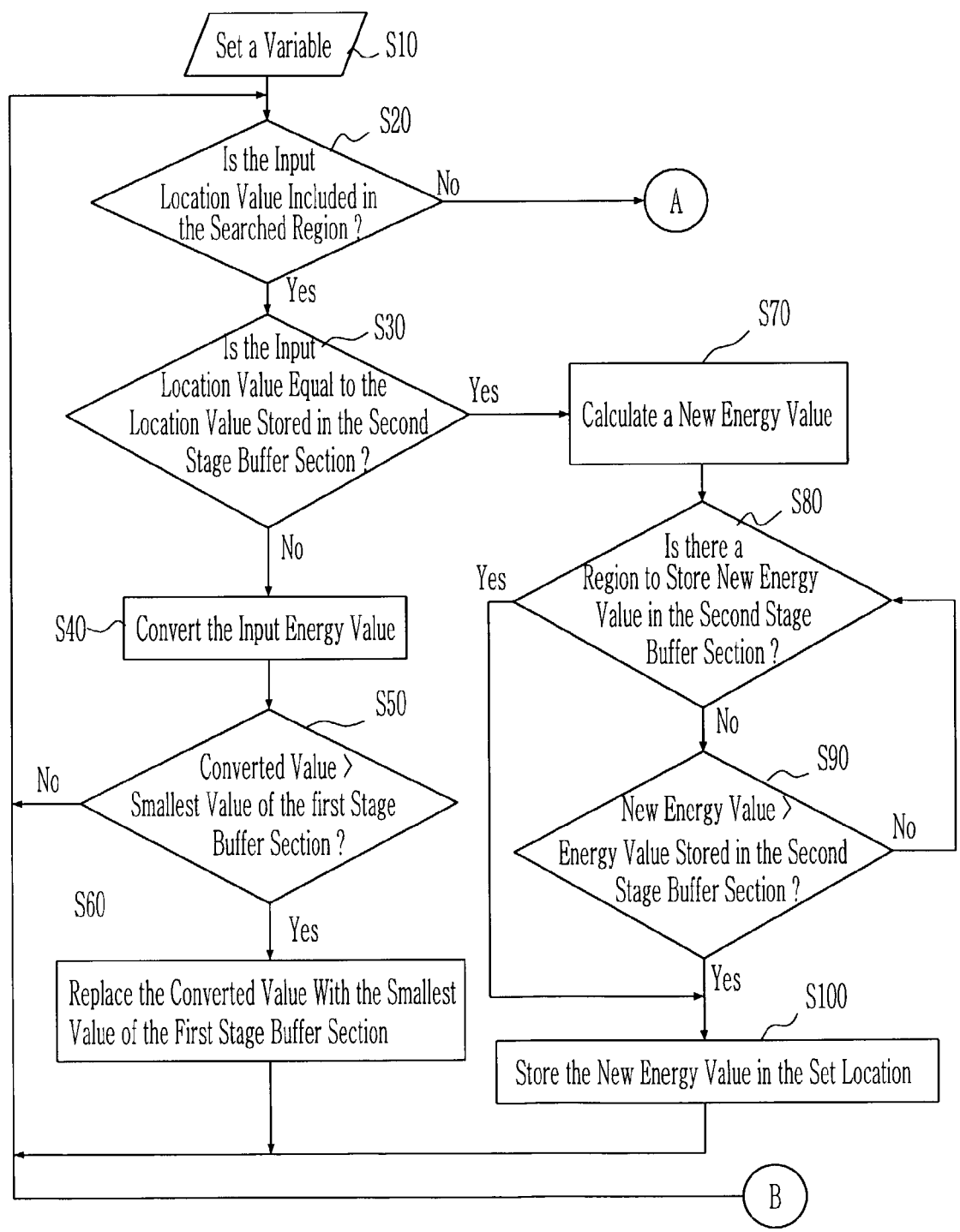

FIGS. 3a and 3b are flowcharts explaining the operation characteristics of the region searcher shown in FIG. 2.

Referring to FIGS. 3a and 3b, firstly, the step S10 is the step for setting variables. In the step S10, the number of iteration, the number of the region, the size N1 of the first stage buffer section 21, the size N2 of the second stage buffer section 22, the ratio R1 of the signals input to the first stage buffer section 21, the ratio R2 of the input signal and the value of the second stage buffer section 22 when they are added each other are set as the variables. Also, the input signal is composed of the location value and the energy value, and is input from a hypothesis location of the searched region.

In addition, the input speed is determined by sampling the input signal in case of the method using the matched filter, and is determined by the integration region of a integrator in the correlator in case of the method using the correlator. Also, the values in the all buffers are reset to '0' at the first operating time. After the location values which are obtained when the operations are performed by the number of iteration and the energy value thereat are read, the operation for resetting to '0' is performed again.

Next, when the input location value and input energy value are input, it is determined whether the input location value is included in the searched region (S20). If the input location value is included in the searched region, it is determined whether the input location value is equal to the location value stored in the second stage buffer section 22 (S30). In the step S30, if the input location value is not equal to the location value stored in the second stage buffer section 22, the input energy value is converted by using the ratio R1, and the converted value is compared with a smallest value among the values stored in the first stage buffer section 21 (S40 and S50). In the step S50, if the converted value is larger than the smallest value, the input location value and input energy value are replaced with the smallest value of the first stage buffer section 21 (S60).

On the other hand, in the step S50, the converted value is smaller than the smallest value, a new input value is received again (S20). In the step S30, if the input location value is equal to the location value of the second stage buffer section 22, the input energy value and the value stored in the second stage buffer section 22 are converted by using the given ratio R2, and the converted values are stored in the second stage buffer section 22 (S70). In the step S70, the new value to be stored to the second stage buffer section 22 is calculated as the following equation (1), and the energy value and the location value in the second stage buffer section 22 equal to the input location value are removed, the lowest buffer therein is emptied in order to arrange the values in descending order. The other words, in the step S70, the values are not formally stored to the second stage buffer section 22 according to the size thereof, but are temporarily stored to position the values at accurate locations in the second stage buffer section 22. Where, Data is a new energy value, DATA is an input energy value, and Prev-DATA is an energy value stored in the second stage buffer section 22.

$$\text{Data}=\text{DATA}*R2+\text{Prev-DATA}(1-R2) \quad (1)$$

Next, in order to find the location where the new energy value is to be stored, it is determined whether there is a region to store new energy value in the second stage buffer section 22, and, if there is an region to store, the new energy value is compared with the energy values stored in the second stage buffer section 22. At the comparison result, if an energy value stored in the second stage buffer section 22 smaller than the new energy value is detected, the energy value and the energy values in the buffers lower than that are downwardly shifted to make the location which allow the large value to be inserted. By this operation, the values of the second stage buffer section are converted and stored in descending order (S80 to S100).

Subsequently, returning to the step S20, the input value is received, and if the searching operation for the given searched region is finished in the step S20, the operation for aligning the values stored in the first stage buffer section 21 and the second stage buffer section 22 to the second stage buffer section 22 in accordance with the size thereof is performed. The value at the highest location in the first stage buffer section 21 is compared with the values of the second stage buffer section 22, beginning at a largest value thereof, and, if the value is larger than the value stored in the second stage buffer section 22, the values of the second stage buffer section 22 smaller than the value of the first stage buffer section 21 are downwardly shifted one by one and the smallest value is removed from the second stage buffer section 22. The values of the first stage buffer section 21 are compared with the values of the second stage buffer section 22 one at a time, thereby the values of the second stage buffer section 22 are corrected.

In the step S110, the value stored at highest buffer in the first stage buffer section 21 is fetched and '0' is inserted thereto. In the step S130, the energy value fetched from the first stage buffer section in the step S110 is compared with the energy value at any one location in the second stage buffer section 22. If the fetched energy value is larger than the energy value of the second stage buffer section 22, the process moves into the step S140. In the step S140, a smallest energy value in the second stage buffer section 22 is removed, the energy values smaller than the value of the fetched from the first stage buffer section are downwardly shifted one by one, and an empty buffer is generated, thereby the location value and the energy value in the first stage buffer section 21 are inserted to the empty buffer. In the step S150, it is determined whether there is an energy value to be fetched in the first stage buffer section.

On the other hand, in the step S130, if the fetched energy value is smaller than the energy value of the second stage buffer section 22, the process moves into the step S120. In the step S120, it is determined whether there is any other location value to read in the second stage buffer section 22. If it exists, the next location value in the second stage buffer section 22 is read. Subsequently, the energy value stored therein is read and the process moves into the step S130. By this process, if there is no any energy value of the second stage buffer section 22 to be compared with the fetched energy value, the operation for comparing the value in the first stage buffer section with all values in the second stage buffer section 22 is finished, and the next value of the first stage buffer section 21 is read and compared with the values of the second stage buffer section 22. By this process, if there is no any value of the first stage buffer section 21 to be compared with that of the second stage buffer section 22, the process moves into the step S160. In the step S160, it is determined whether the iteration is ended, and according to the results, the process moves into the step S20 (B) or finished. If there is no any value to be fetched from the first stage buffer section 21, the iteration number is checked. If the iteration number is not the set iteration number, the input signal is subsequently processed.

Figure 4:
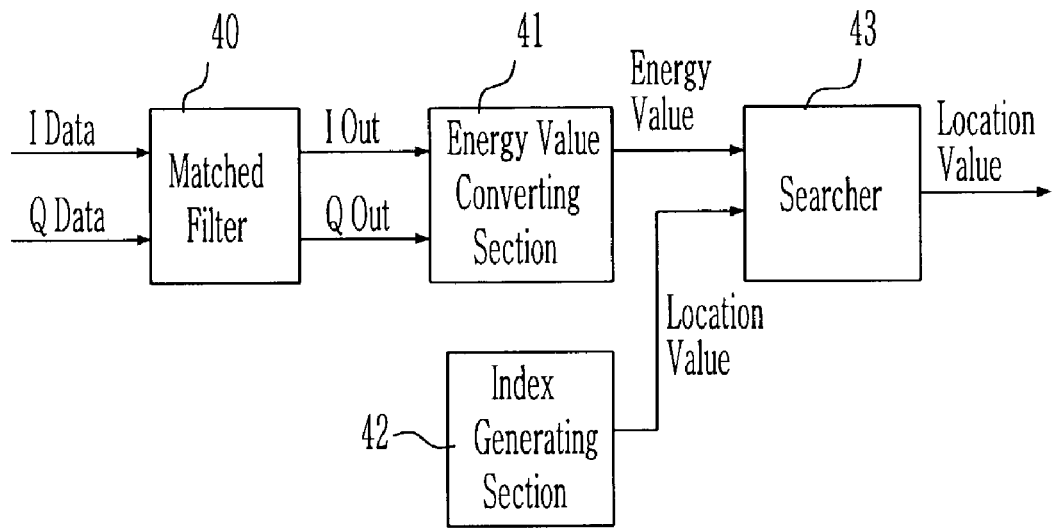
FIG. 4 is a block diagram of a matched filter code searcher using the region scanner shown in FIG. 2.

FIG. 4 is a block diagram of a matched filter code searcher using the region search shown in FIG. 2, and has the structure which the searcher 43 having the region searching function according to the present invention is added to the general structure having a matched filter 40, an energy value converting section 41, and an index generating section 42.

The matched filter 40 and the energy value converting section 41 which is the general component store the input signals, correlate the input signals with a given pattern, and adds these correlated values, and the obtained inphase and quadrature values are squared and added them to converted to the energy value, in order to remove the phase component. In addition, the location value obtained in the index generating section 42 is stored in the searcher 43 shown by the present invention, and the finally obtained location value having a large energy value is outputted. In this case, the index generating section 42 separately generates the location values and the generated location values are used as the location value of the searcher 43.

As an example using the structure shown in FIG. 4, there is an asynchronous IMT-2000 cell searcher. A primary synchronization channel which the cell searcher searches has 2560 chip periods, the channel is transmitted during the $1/10$ period, and the channel is not transmitted during the remaining period. In such non-continuous transmission channel structure, because every values of the transmission signals must be used by using the matched filter and the input hypothesis location value must be obtained in order to receive the transmission signal, the signal-to-noise ratio of the signal becomes deteriorated. Accordingly, at the same hypothesis location energy values iteratively obtained at the searched region must be added. Also, because the correlated values for the hypothesis location are generally obtained at the ½ chip interval by the correlation characteristics of the spread code in the given searched region, 5120 energy values must be stored in all.

In addition, as another example, when the size of the matched filter restricts the implementation of the hardware or the size of the matched filter can not become larger than the certain value by the non-coherent characteristics, the region must be iteratively searched to obtain the hypothesis value. Accordingly, by using the above-mentioned structure according to the present invention, the effective implementation thereof can be accomplished.

Figure 5:
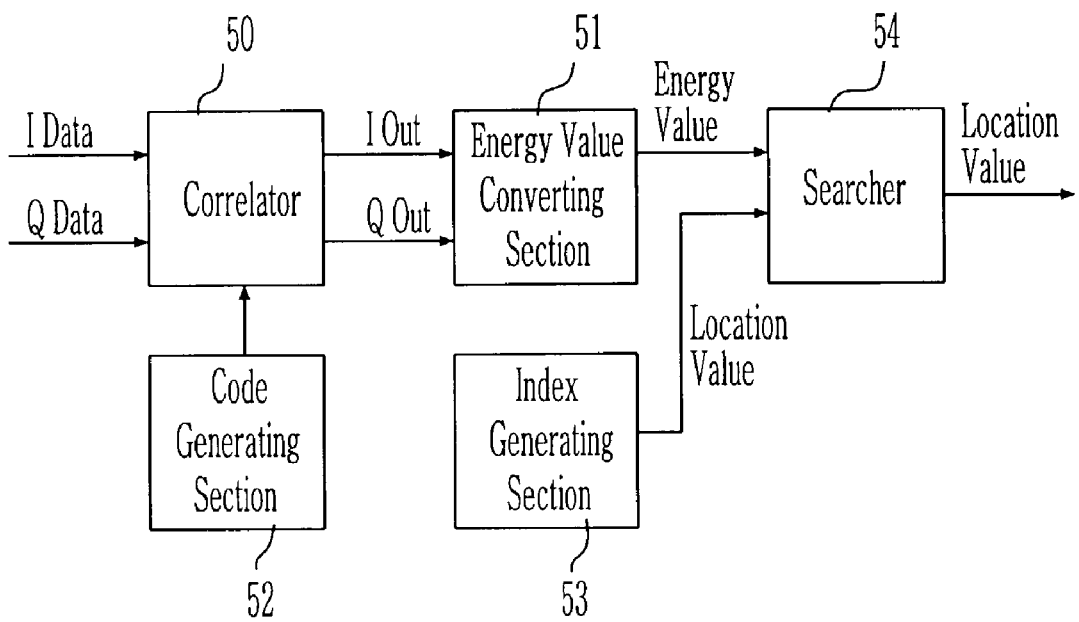
FIG. 5 is a block diagram of a correlator code searcher using the region scanner shown in FIG. 2.

FIG. 5 is a block diagram of a correlator code searcher using the region searcher shown in FIG. 2, and has the structure which the searcher 54 having the region searching function according to the present invention is added to the general structure having a correlator 50, a energy converting section 51, a code generating section 52, and an index generating section 53.

The correlator code searcher shown in FIG. 5 obtains the energy value depending on the hypothesis location value by using the correlator 50. Like this, in case of using the correlator 50, the code generating section 52 which is the local spread signal generator must be used, and the code generating section generates spread code in accordance with the hypothesis location value.

This method reduce the implementation complexity thereof in comparison with the method using the matched filter shown in FIG. 4, but the processing speed thereof is remarkably increased because the signals in the integration region of the correlator 50 are collected in order to obtain the value corresponding to the one hypothesis location value. In order to remove the phase component included in the obtained correlated value, the energy converting section 51 squares the correlated values and adds them to generate the energy value.

Also, the energy values for every hypothesis location value are stored, and, when the given region is iteratively searched and the energy values are iteratively generated by the hypothesis location values, these energy values are processed by the correlator to find the desired large location value by using the searcher 54.

As mentioned above, the present invention can remarkably reduce the implementation complexity thereof by storing the energy value corresponding to the same hypothesis location value by using a searcher having divided two buffers, without simply using a memory, when a predetermined region is iteratively searched.

In addition, the present invention can remarkably reduce the implementation complexity thereof in case where the region is iteratively searched in the state of the deteriorated signal-to-noise ratio to find the energy value at one hypothesis location and in case where the region must be iteratively searched because of the restriction which the size of the matched filter can be not increased.

What is claimed is:

1. A region searcher comprising:
    an input signal converting section for receiving an energy value and converting the energy value;
    a first buffer section for storing a first converted energy value converted by said input signal converting section;
    a second buffer section for storing an added value obtained from a second converted energy value converted by said input signal converting section;
    a comparing section for comparing an input location value with a location value stored in said second buffer section in order to search the location value stored in the second buffer section;
    an output signal converting section for converting an energy value stored in said second buffer section; and
    an adder for adding the second converted energy value output from said input signal converting section and the converted energy value output from said output signal converting section and storing the added value to the second buffer section.

2. The region searcher according to claim 1, wherein said first buffer section stores large energy values by an allowable number among searched energy values, in a firstly searched region, and stores large location values by the allowable number among input location values except for location values stored in said second buffer section, in an iteratively searched region.

3. The region searcher according to claim 2, wherein said searched region is the region of a predetermined hypothesis location.

4. The region searcher according to claim 1, wherein said second buffer section stores a largest energy value among the energy values, in firstly searched region, and stores the input energy value thereat if the input location value is equal to the location value stored in said second buffer section, in iteratively searched region.

5. The region searcher according to claim 3, wherein said searched region is the region of a predetermined hypothesis location.

6. The region searcher according to claim 1, wherein said input signal converting section converts the input energy value in accordance with a predetermined energy value ratio if the input location value is not equal to the location value stored in said second buffer section.

7. The region searcher according to claim 1, wherein said adder adds the second converted energy value output from said input signal converting section and the energy value output from said output signal converting section and stores the added energy value to said second buffer section, if the input location value is equal to the location value stored in said second buffer section.

8. The region searcher according to claim 1, wherein the first converted energy value is compared with the energy value stored in said first buffer section if the input location value is not equal to the location value of said second buffer section, and, the first converted energy value is replaced with a smallest energy value of said first buffer section if the first converted energy value is larger than the energy value stored in said first buffer section.

9. A method of driving a region searcher comprising the steps of:
  (a) setting variables;
  (b) receiving an input energy value and an input location value by using an input signal converting section and an index comparing section;
  (c) comparing said input location value with a location value stored in a second buffer section by using said index comparing section;
  (d) converting said input energy value by a first predetermined energy value ratio by using said input signal converting section; if said input location value is not equal to the location value stored in said second buffer section in the (c) step;
  (e) comparing the energy value converted in the (d) step with a smallest energy value stored in a first buffer section, and, if the converted energy value is larger than the smallest energy value stored in said first buffer section, replacing said converted energy value with the smallest energy value among energy values stored in said first buffer section, and, if the converted energy value is not larger than the smallest energy value stored in said first buffer section, receiving a new energy value;
  (f) converting the input energy value and the energy value stored in said second buffer section by using a second predetermined energy value ratio if said input location value is equal to the location value stored in said second buffer section in the (c) step; and
  (g) removing the energy value stored in a location of said second buffer section corresponding to the input location value in order to store an added energy value computed by adding the energy values converted in the (f) step, aligning the energy values in the second buffer section in accordance with the size thereof, and storing said added energy value thereto.

10. The method of driving a region searcher according to claim 9, wherein further comprising:
  (c') reading the energy values stored in said first buffer section in stored order and inserting 0 to the location thereof, if the input location value is not included in the searched region in the (c) step;
  (d') comparing the energy value read from said first buffer section in the (c') step with the energy value stored in said second buffer section;
  (e') removing a smallest energy value among the energy values stored in said second buffer section if the energy value read from said first buffer section is larger than the energy value stored in said second buffer section in the (d') step, downwardly shifting the energy values smaller than the energy value read from said first buffer section one by one, among the energy values stored in said second buffer section, and inserting the energy value of said first buffer section to an empty space of the said second buffer section;
  (f') determining whether there is an energy value to be read from the second buffer section, if the energy value read from said first buffer section is smaller than the energy value stored in said second buffer section in the (d') step and reading the energy value from said second buffer section if there is an energy value to be read from the second buffer section; and
  (g') searching the energy values stored in said first buffer section if there is no any energy value to be read from said second buffer section in the (f') step and determining whether every energy values stored in said first buffer section are read.

11. The method of driving a region searcher according to claim 9, wherein the (g) step of removing the energy value comprises the step of comparing said added energy value with the energy values stored in said second buffer section in descending order, and, if the energy values stored in the second buffer section smaller than the added energy value is detected, downwardly shifting said energy values smaller than the converted energy value one by one to store the added energy value thereto.

12. A code searcher comprising:
  a matched filter for receiving input signals including in-phase and quadrature phase components and outputting the correlated value of said input signals;
  an energy converting section for squaring the in-phase and the quadrature phase and adding them to be converted to an energy value, in order to remove the in-phase and quadrature phase components included in said correlated value;
  an index generating section for generating a location value corresponding to said energy value; and
  a region searcher for receiving the energy value output from said energy value converting section and the location value generated by said index generating section to detect a code spread signal, the region searcher comprising:
    an input signal converting section for receiving an energy value and converting the energy value;
    a first buffer section for storing a first converted energy value converted by said input signal converting section;
    a second buffer section for storing an added value obtained from a second converted energy value converted by said input signal converting section;
    a comparing section for comparing an input location value with a location value stored in said second buffer section in order to search the location value stored in the second buffer section;
    an output signal converting section for converting an energy value stored in said second buffer section; and
    an adder for adding the second converted energy value output from said input signal converting section and the energy value output from said output signal converting section and storing the added value to the second buffer section.

13. A code searcher comprising:
  a correlator for receiving input signals including in-phase and quadrature phase components and outputting the correlated value of said input signals;
  a code generating section for generating and outputting a code spread signal in successive code searching regions without the loss of calculation time;

an energy converting section for squaring said in-phase and quadrature phase and adding them to be converted to an energy value in order to remove the in-phase and quadrature phase components included in said correlated value;

an index generating section for generating a location value corresponding to said energy value; and a region searcher for receiving the energy value output from said energy value converting section and the location value of said index generating section to detect the code spread signal, the region searcher comprising:

an input signal converting section for receiving the energy value and converting the energy value;

a first buffer section for storing a first converted energy value converted by said input signal converting section;

a second buffer section for storing an added value obtained from a second converted energy value converted by said input signal converting section;

a comparing section for comparing an input location value with a location value stored in said second buffer section in order to search the location value stored in the second buffer section;

an output signal converting section for converting an energy value stored in said second buffer section; and an adder for adding the second converted energy value output from said input signal converting section and the energy value output from said output signal converting section and storing the added value to the second buffer section.

* * * * *